April 3, 1956 F. P. KEIPER 2,740,682

CABINET

Filed June 19, 1948 3 Sheets-Sheet 1

INVENTOR
FRANCIS P. KEIPER
BY F. P. Keiper
ATTORNEY

April 3, 1956 F. P. KEIPER 2,740,682

CABINET

Filed June 19, 1948 3 Sheets-Sheet 2

INVENTOR
FRANCIS P. KEIPER
BY F. P. Keiper
ATTORNEY

April 3, 1956 F. P. KEIPER 2,740,682

CABINET

Filed June 19, 1948 3 Sheets-Sheet 3

INVENTOR
FRANCIS F. KEIPER
BY F. P. Keiper
ATTORNEY

United States Patent Office 2,740,682
Patented Apr. 3, 1956

2,740,682

CABINET

Francis P. Keiper, Cazenovia, N. Y.

Application June 19, 1948, Serial No. 34,039
19 Claims. (Cl. 312—12)

This invention relates to phonograph record cabinets, and more particularly to the storage of records of the disk type.

With multiple record playing phonographs, it is desirable to be able to select quickly and with minimum effort a dozen or more records for stacking on the record playing and changing mechanism. It is equally desirable to be able to quickly return such records to a record storage cabinet after playing, in such manner that the records will be positioned at identifiable locations, for ready subsequent selection. Present methods of record storage center about record albums, each of which stores a number of records in book form. To select records from such albums and return records thereto is a tedious task, requiring the lifting, removal of, and replacement of various groups of records as contained in various albums, and the individual selection of the desired records from each album. The system is cumbersome, time consuming, and invites disorder, in the care and storage of records, and requires the handling of many times the number of records to be selected, as well as being costly.

It is accordingly an object of the present invention to provide a record storage system, where individual records are selectable and returnable at will to a prearranged file with a minimum of effort.

A further object of the invention is to provide a record storage file in which individual records may be withdrawn directly and without disturbing other records, and in which the identity of each stored record is plainly visible.

A still further object of the invention is to provide a record storage file, in which there is provided a space for every record, and in which records may be withdrawn from and returned to each of such spaces with a minimum of effort, and in which the records are stored with a minimum danger of breakage.

Another object of the invention relates to the construction and arrangement of a file of the type described in which the various elements and parts thereof may be produced economically, and are of a rugged and durable nature.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, in which like reference characters indicate like parts:

Figures 1, 2:
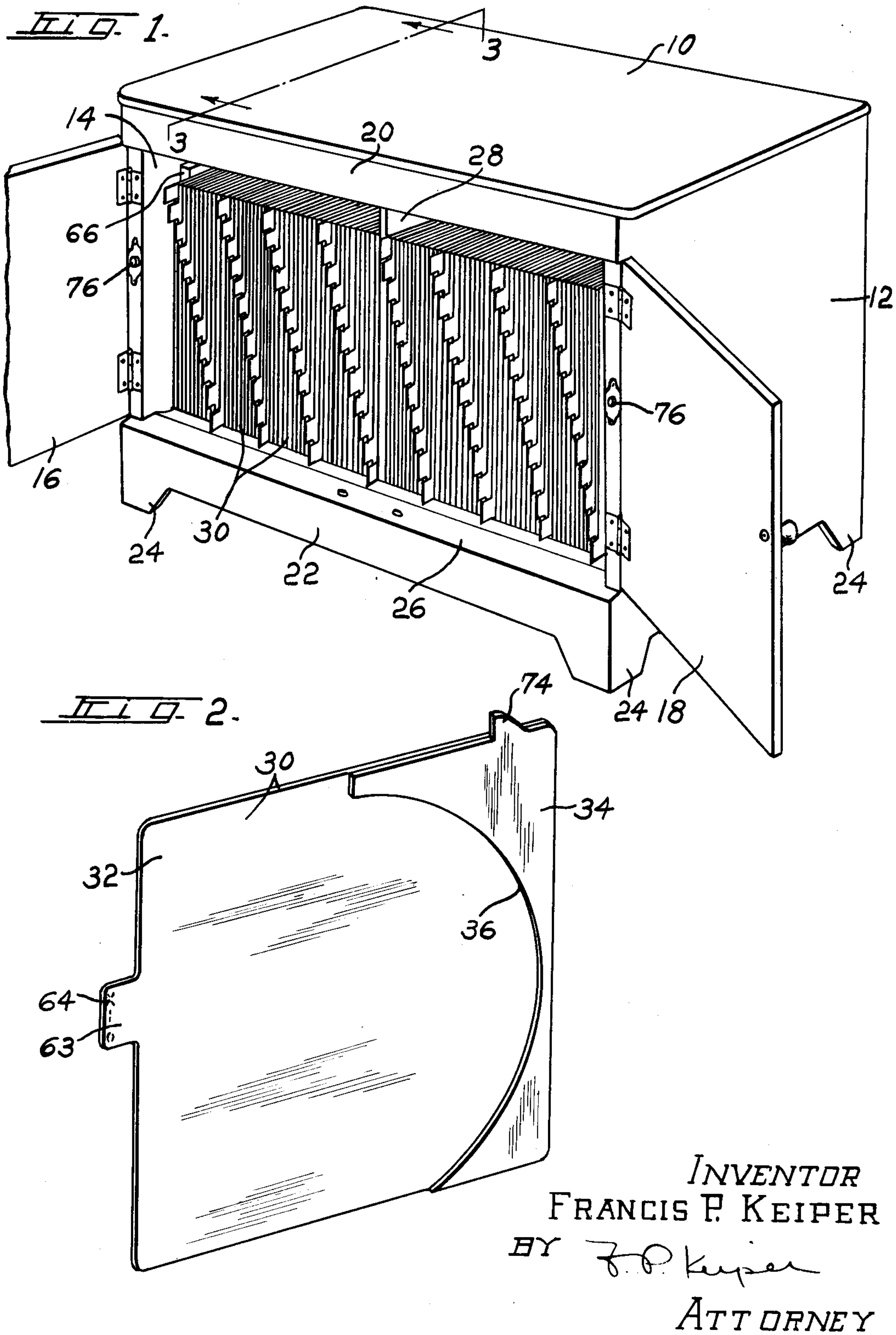
Figure 1 is a perspective view of a record cabinet embodying the invention.
Figure 2 is a perspective view of a single guide partition employed in the cabinet of Figure 1.
Figures 3, 4, 5:
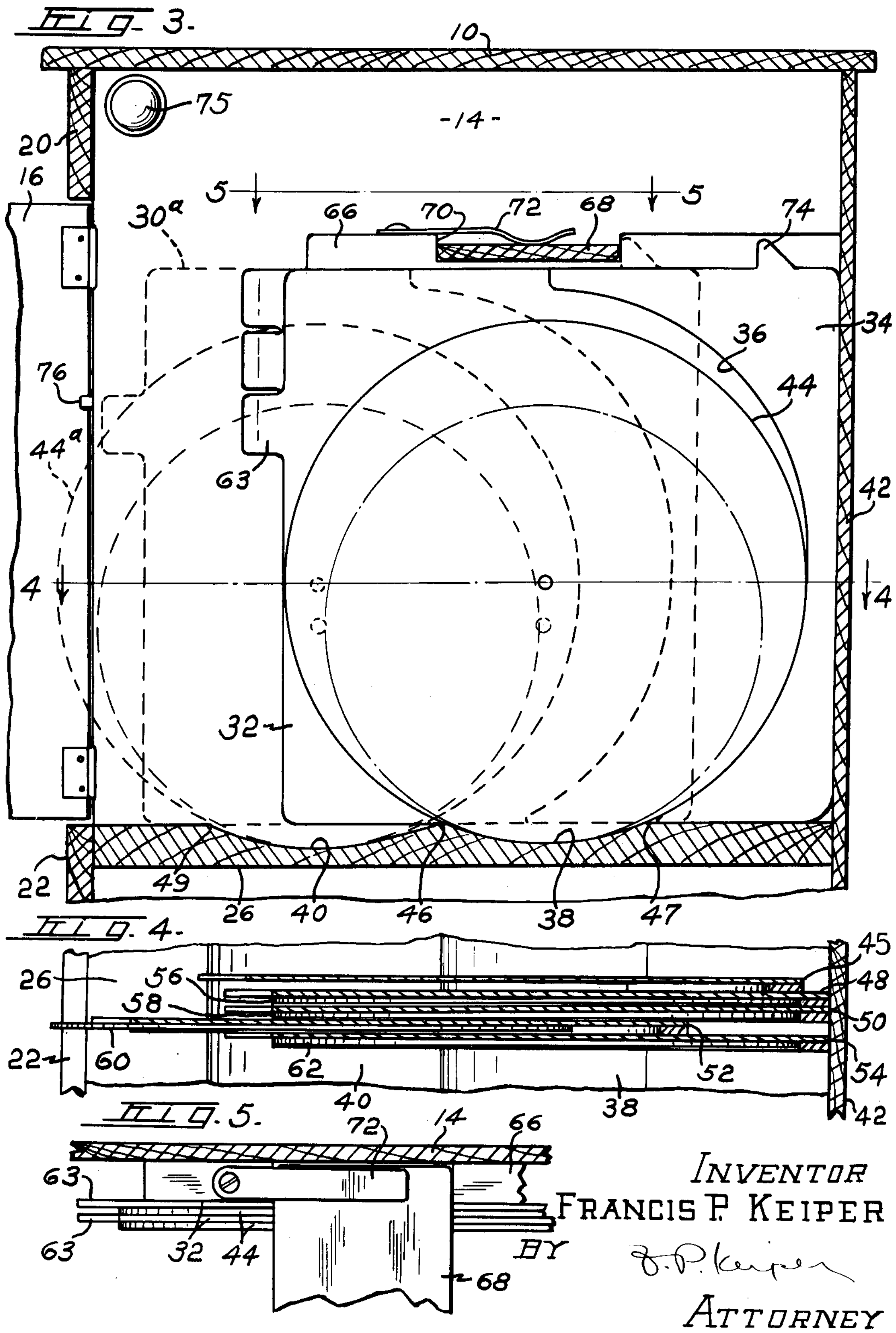
Figure 3 is a transverse section taken substantially on the plane 3—3 of Figure 1.
Figure 4 is a fragmentary longitudinal section taken substantially on the line 4—4 of Figure 3.
Figure 5 is a fragmentary longitudinal section taken on the line 5—5 of Figure 3.

Referring to the drawings, and particularly to Figures 1, 2 and 3, there will be seen a cabinet having a top 10, and walls 12 and 14, a forward wall comprising hinged doors 16 and 18, and a front top rail 20. The cabinet is formed upon a base 22, having suitable feet 24, and providing a bottom shelf 26.

The shelf is divided by a central partition 28 of rigid material such as wood or the like, and mounted upon the shelf are a plurality of spaced partition members 30. Each of the partition members 30 comprises a sheet of material 32, such as heavy pressboard, of a thickness of the order of about .04 inch, and a record-engaging block 34 having an arcuate forward edge 36 suitably shaped to somewhat approximately conform to the edge of 10 and 12 inch records. The blocks 34 are of a thickness substantially that of a typical disk record, or somewhat thicker, so that with a stack of partitions 30, the sheet members 32 will be suitably spaced to receive a plurality of records one between each two adjacent sheet members. Each block is rigidly secured to its respective sheet member by cement glue, or mechanical means.

As shown in Figure 3, the bottom shelf 26 is provided with a pair of longitudinally extending grooves 38 and 40, the grooves being shown as cylindrical in shape to receive the curved edges of the records to be edgewise supported thereupon. The radius of the grooves, as shown, is approximately that of a 12 inch diameter record, but may be that of a 10 inch record, if desired; and in either case, records may be intermixed and will be adequately supported even though the groove radius may be for a 10 inch record or 12 inch record. Where the radius be for a 10 inch record, it will be appreciated that 12 inch records will be supported upon the lateral edges 45 and 47 or 45 and 49 of the grooves 38 and 40.

The groove 38 will be positioned forward of the back wall 42 a distance such that a 12 inch record, such as 44, will be received squarely in the groove and approximately nest against the arcuate edge 36 of the partition block 34. By this arrangement, records are maintained in stored position by seating in the groove 38. By sliding any selected partition forward to a position such as that indicated by the dotted lines as at 30a, the record bearing against the block 36 will be caused to roll over the hump 45 and thence caused to roll into the forward groove 40 placing the record in an accessible position as is indicated in dotted lines at 44a. It will be observed that each partition is adapted to slide forwardly in the manner described to bring the particular record adjacent such partition on the block side thereof to the forward accessible position described.

In Figure 4, there are shown a group of five adjacent partitions 46, 48, 50, 52 and 54. Records 56, 58, 60 and 62 are shown adjacent to partitions 48, 50, 52 and 54. The partition 52 has been drawn forward to render the record 60 accessible as illustrated both in this figure and in Figure 3. The partition 46 is shown without any record but is positioned slightly forward to indicate that a record has been withdrawn. Thus it will be seen that after removing a record such as 60 from the partition 52, it may be slid rearwardly to the position shown, for the partition 46 to indicate where the record is to be returned.

It will be observed that each of the partitions is provided with an indicia tab, such as 63 (see Figure 2), the tabs on successive partitions being staggered so as to make it possible to observe all tabs at any one time. Assuming that each partition is something greater than 12 inches in height and that the tabs are 1 inch in vertical width, 12 such tabs may be arranged in a row from top to bottom without overlapping one another. Since records such as are adapted to be stored by the system shown are approximately $1/10$ of an inch thick, and the pressboard from which the partitions are made is approximately from .03 to .05 inch thick, it will be seen that the successive staggered rows of tabs will occur at intervals of one to one and one-half inches. The tabs are thus adequately spaced so as to render all readily readable by a person desiring to select a record or a sequence of records from the cabinet.

It will also be seen that if the indica be placed on the outer edge of the tab, as indicated at 64, when such partition is positioned as is the partition 46 in Figure 4, such partition will not obstruct the view of the adjoining tabs so as to interfere with the selection of such adjacent records as may be desired.

As previously described, the cabinet, because of the length shown, is divided by a center partition 28, and the slidable partitions are spaced from the end walls 12 and 14 by spacer members 66. The spacer members extend somewhat above the upper edge of the partitions 32, and support a longitudinally extending guide slat 68 held in position in a notch 70 by a spring finger 72. The guide slat 68 tends to maintain the partitions in the position shown and restrict the motion in sliding the partitions forward and back, to rectilinear motion. Further, each partition is provided with an ear 74 formed preferably as a part of block 34, although it may be a part of partition member 32 or both, as may be desired, which ear will engage the slot 68 to limit the forward motion to that shown by the dotted line 30ᵃ.

Located inside the front rail 20 and at either end, is a light bulb 75 connected in series with switches 76 connected in parallel such that when either of the doors 16 and 18 are opened, both lights will light. The lights are preferably so positioned behind the rail 20 as not to glare outwardly into the eyes of a person located in front of the cabinet, but are so positioned as to angularly direct a beam of light rearwardly on the tabs of each of the partitions, so that no difficulty will be had in identifying any particular selection to be chosen. It will also be appreciated that the bulbs 75 may take the form of one or more tubular light bulbs extending across the entire length of the cabinet immediately behind the rail 20 and beneath the top 10. Such an arrangement would place such bulb in alignment with the bulb 75 shown.

The slat 68 is removably held in position by the spring 72 so that at any time by removing the slat, the sliding partitions may be removed completely from the cabinet.

Figure 6:
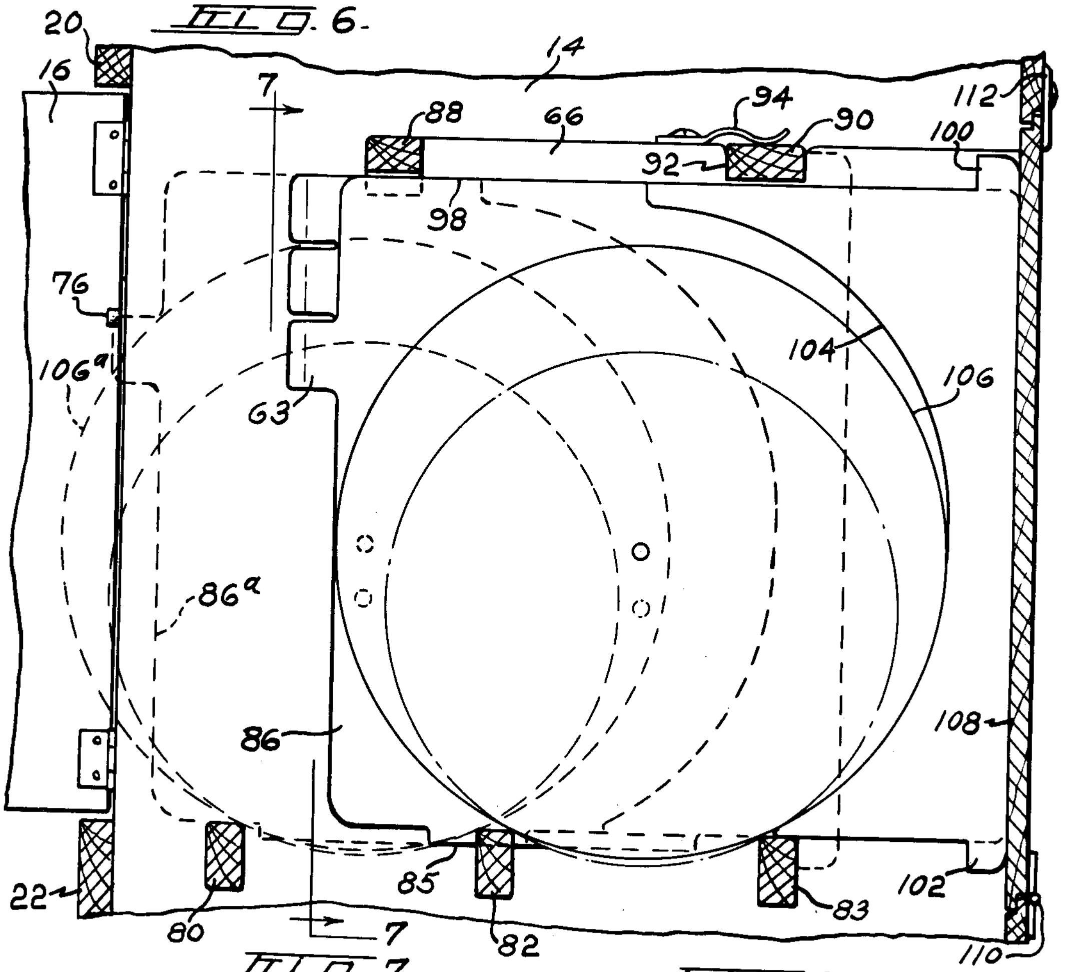
Figure 6 is a transverse section taken through the cabinet, showing a modified form of the invention.
Figures 7, 8:
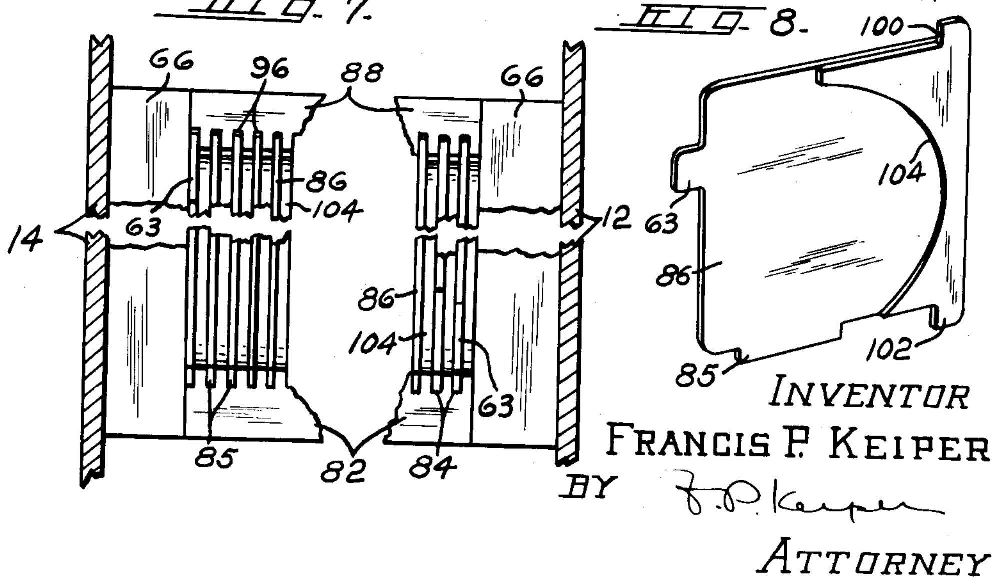
Figure 7 is a fragmentary transverse section taken substantially on the line 7—7 of Figure 6.
Figure 8 is a perspective view of a guide partition employed in the modification of Figure 6.

In the modification shown in Figures 6, 7 and 8, there are provided three support rails 80, 82 and 83, in place of the shelf 26 with its longitudinal grooves 38 and 40. The rails 80, 82 and 83 are suitably spaced so as to support 10 and 12 inch records in substantially the same manner as the grooves shown in Figure 3. The rail 82 may be slotted as at 84 to receive the edge portions 85 of the partition members 86. Top guide rails 88 and 90 are also provided, the latter being positioned in a notch 92 in the end spacer member 66, there also being provided a spring member 94 to permit removal thereof when desired. The forward spacer bar 88 is notched as at 96 to receive the upper edge 98 of the partitions 86. The partitions 86 at their rear are provided with upwardly and downwardly extending ears 100 and 102 which are adapted to engage the rails 83 and 90, respectively, to limit the forward movement of the partition to that indicated in dotted lines as at 86ᵃ.

It will be seen that the operation of the arrangement thus described is similar in many respects to that shown in Figure 3. By sliding any selected partition 86 forward to the position shown at 86ᵃ, a record 106 bearing against the partition block 104 will be caused to roll over the rail 82 into the position shown at 106ᵃ, for example. In the arrangement shown in Figure 6, the partitions may be inserted from the rear of the cabinet through a drop door 108 hinged as at 110 and held in the position shown by a button 112. In this particular modification, notches 84 and 96 have been shown in the respective rails 82 and 88. However, it will appear obvious that the partitions tend to space themselves, and in many instances, such notches, either in one or both of the rails, may be dispensed with.

It will be seen from a consideration of the disclosure thus described that there is provided an arrangement for holding a large number of disk records of the type described. Assuming that 10 records may be stacked in a space of approximately 1.5 inches, a cabinet 30 inches long may be expected to hold in the neighborhood of 200 records. The records are so stored that each one is identifiable by the tab on the particular partition adjoining that particular record. Through the illumination projected upon the tabs, any particular record may thus be quickly selected. After having selected 10 or more records, for example, for loading a typical automatic record changer phonograph, the partitions may be moved rearwardly to within a quarter inch or so of their rearwardmost position to indicate where records have been removed. If the order of the records as taken from the file is not disturbed in loading the record changer, after playing, the records may be replaced in the cabinet in the order removed, without even bothering to check the indicia on the partitions. In this manner, it will be seen that it is most easy not only to select records but also to return them to the positions from which they were taken. In practice, one set of records may be withdrawn in the manner described and the partitions returned to within ⅛ inch, for example, of the normal return position.

While such records are being played on the record changer, a second set of records may be selected, and the partitions adjoining these records may be returned to a slightly greater distance from the normal return position, to indicate the location from which the second set were taken. When the first set has been played, and the second set has been set on the record changer, the first set may be returned to the partitions which would be identified by the positioning utilized for indicating such first set of records as described; and upon completion of the playing of the second set of records, they may be readily replaced adjoining the partitions which were positioned at a predetermined space from their normal retracted position to indicate such second set of records.

Thus, it will be seen that records may be so readily withdrawn and returned to the cabinet that little excuse will be provided for failure to return the records to their respective positions. While the tabs on each individual partition are not of a size to admit of affixing a complete record title thereto, nevertheless the tabs are sufficiently large to carry in print at least a code word or a descriptive word of a title of each record, if desired. On the other hand, each record may be given a serial number and the number itself inserted upon the tab. Those persons utilizing the cabinet will soon discover that the code word or a serial number placed on the tab will adequately indicate the record which is represented by that code number, and the code number or name will become interchangeable with the record title in the mind of any person who utilizes such cabinet with frequency.

It will be seen that the sheet material from which the partitions are formed is preferably a relatively stiff, tough, yet thin material, which will readily slide upon the adjacent block of the adjacent partition. Also, such material should be hard-surfaced and smooth to permit records to roll from one groove to the other, and to prevent adjoining records from being moved by movement of any partition for moving the specific record cooperating therewith. Additionally, it will be seen that the blocks may be variously formed, or made in separate pieces such as corner pieces, but that the horizontal length thereof should be substantially greater than the allowable forward movement of the partition, so as to preserve the stack, and the space factors between partitions. While but eight staggered rows of tabs are showin in Figure 1, it will be apparent that double this number of rows will be present in a cabinet adapted to hold records of 1/10 inch thickness. It will also appear that thicknesses have been exaggerated to assist the illustration of the invention.

Although two modified forms of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a disk record storage cabinet, a stationary record support means, a plurality of upstanding partitions resting on said support means, means for spacing said partitions approximately the thickness of a disk record, there being one single partition between each pair of records adapted to contact the adjacent faces of adjacent records on opposite sides of the partition, and means attached to each partition on one side only for moving a record adjacent thereto upon movement of each partition, said record support means being adapted to support records between said partitions independently of said partitions.

2. In a disk record storage cabinet, a stationary record support means, a plurality of upstanding partitions resting on said support means, means for spacing said partitions approximately the thickness of a disk record, there being one single partition between each pair of records adapted to contact the adjacent faces of adjacent records on opposite sides of the partition, means attached to each partition on one side only for moving a record adjacent thereto upon movement of each partition, said record support means being adapted to support records between said partitions independently of said partitions, and means for restricting movement of each partition to substantially horizontal rectilinear motion.

3. In a disk record storage cabinet, a stationary record support means, a plurality of upstanding partitions resting on said support means, means for spacing said partitions approximately the thickness of a disk record, there being one single partition between each pair of records adapted to contact the adjacent faces of adjacent records on opposite sides of the partition, means attached to each partition on one side only for moving a record adjacent thereto upon movement of each partition, said record support means being adapted to support records between said partitions independently of said partitions, means for restricting movement of each partition to substantially horizontal rectilinear motion, and means for establishing limits for the horizontal movement of said partitions.

4. In a disk record storage cabinet, a support means for edgewise supporting an arcuate portion of a plurality of records, a plurality of partitions resting edgewise on said support means, and slidable thereon, there being one single partition between each pair of records adapted to contact the adjacent faces of adjacent records on opposite sides of the partition, means for spacing said partitions a distance equivalent to the thickness of a record to be stored between adjacent partitions, and means attached to each partition on one side only for engaging an edge of a record adjacent each partition, for causing movement of an adjacent record across said support means upon movement of each partition.

5. In a disk record storage cabinet, a support means for embracing and edgewise supporting an arcuate portion of a plurality of records, a plurality of partitions resting edgewise on said support means, and slidable thereon, there being one single partition between each pair of records adapted to contact the adjacent faces of adjacent records on opposite sides of the partition, means on one side only of each partition for spacing said partitions a distance equivalent to the thickness of a record to be stored between between adjacent partitions, said means being effective to maintain said spacing upon limited movement of one partition relative to another, and means attached to each partition on said one side only for engaging an edge of a record adjacent each partition, for causing movement of an adjacent record across said support means upon movement of each partition.

6. In a disk record storage cabinet, a support means for embracing and edgewise supporting an arcuate portion of a plurality of records, a plurality of partitions resting edgewise on said support means, and slidable thereon, there being one single partition between each pair of records adapted to contact the adjacent faces of adjacent records on opposite sides of the partition, means on one side only of each partition for spacing said partitions a distance equivalent to the thickness of a record to be stored between adjacent partitions, said means being effective to maintain said spacing upon limited movement of one partition relative to another, and means attached to each partition on said one side only for engaging an edge of a record adjacent each partition, for causing movement of an adjacent record across said support means upon movement of each partition, and means for establishing limits for the movement of all partitions.

7. In a disk record storage cabinet, a support for a plurality of records, said support being adapted to engage an arcuate portion of the edges of a plurality of records stacked in vertical and parallel relation to one another, means for maintaining said records in vertical position, said means comprising end walls and a plurality of single relatively thin partitions interposed between each adjacent pair of records, and slidably supported on said support, and spacing means attached to each partition on one side thereof only and of a thickness of a record, said spacing means being located so as to cause a record to move across said support upon horizontal movement of the corresponding partition across said support.

8. In a disk record storage cabinet, a support for a plurality of records, said support being adapted to engage an arcuate portion of the edges of a plurality of records stacked in vertical and parallel relation to one another, said support being adapted to locate records in alignment with one another by gravity, means for maintaining said records in vertical position, said means comprising end walls and a plurality of single relatively thin partitions interposed between each adjacent pair of records, and slidably supported on said support, and spacing means attached to each partition on one side thereof only and of a thickness of a record, said spacing means being located so as to cause a record to move across said support upon horizontal movement of the corresponding partition across said support.

9. In a disk record storage cabinet, a base adapted to support and edgewise engage a plurality of records, spaced vertical end walls, and a back member, a plurality of upstanding partitions arranged side by side and parallel with said end walls, adjacent partitions being spaced substantially the thickness of a record and adapted to lie in contact with the opposed faces of an intervening record, said partitions being slidable relative to one another transversely of said base, each of said partitions having a block of a shape substantially complemental to the peripheral edge of a phonograph record on one surface thereof only and to the rear thereof, whereby a record stored between two adjacent partitions may be drawn forward by forward movement of the partition having said block.

10. In a disk record storage cabinet, a base adapted to support and edgewise engage a plurality of records, spaced vertical end walls, and a back member, a plurality of upstanding partitions arranged side by side and parallel with said end walls, said partitions being slidable relative to one another transversely of said base, each of said partitions having a block of a shape substantially complemental to the peripheral edge of a phonograph record on one surface thereof only and to the rear thereof, whereby a record stored between two adjacent partitions may be drawn forward by forward movement of the partition having said block, said base having a longitudinal shallow groove in its upper face, the center of which is spaced from the back member by a distance at least as great as the radius of a record to be stored.

11. In a disk record storage cabinet, a base, spaced vertical end walls, and a back member, a plurality of upstanding partitions arranged side by side and parallel with said end walls, said partitions being slidable relative to one another transversely of said base, each of said partitions having a block of a shape substantially complemental to the peripheral edge of a phonograph record on one surface thereof only and to the rear thereof, whereby a record stored between two adjacent partitions may be drawn forward by forward movement of the partition having said block, said base having a longitudinal shallow groove in its upper face, the center of which is spaced from the back member by a distance at least as great as the radius of a record to be stored, and a second shallow groove positioned forward of said last-named groove, said grooves being adapted to hold a record edgewise in stored position or forward position, and to prevent free rolling of a record when positioned directly above either of said grooves.

12. In a disk record storage cabinet, a base, spaced vertical end walls, and a back member, a plurality of upstanding partitions arranged side by side and parallel with said end walls, adjacent partitions being spaced substantially the thickness of a record and adapted to lie in contact with the opposed faces of an intervening record, said partitions being slidable independently of one another transversely of said base, each of said partitions having a block of a shape substantially complemental to the peripheral edge of a phonograph record on one surface thereof only and to the rear thereof, and adapted to contact the adjacent faces of a pair of records spaced by the partition, whereby a record stored between two adjacent partitions rests upon said base and may be drawn forward by forward movement of the partition having said block, said partitions having label tabs on their forward edges, said tabs being staggered sequentially from top to bottom to permit ready access to single tabs, and to permit free uninterfered observation thereof.

13. In a disk record storage cabinet, a base, spaced vertical end walls, and a back member, a plurality of upstanding partitions arranged side by side and parallel with said end walls, said partitions beng slidable independently of one another transversely of said base, each of said partitions having a block of a shape substantially complemental to the peripheral edge of a phonograph record on one surface thereof only and to the rear thereof, and adapted to contact the adjacent faces of a pair of records spaced by the partition, whereby a record stored between two adjacent partitions rests upon said base and may be drawn forward by forward movement of the partition having said block, said base having a longitudinal shallow groove in its upper face, the center of which is spaced from the back member by a distance at least as great as the radius of a record to be stored, said partitions having label tabs on their forward edges, said tabs being staggered sequentially from top to bottom to permit ready access to single tabs, and to permit free uninterfered observation thereof.

14. In a disk record storage cabinet, a base, spaced vertical end walls, and a back member, a plurality of partitions arranged side by side and parallel with said end walls, said partitions being slidable transversely of said base, each of said partitions having a block of a shape substantially complemental to the peripheral edge of a phonograph record on one surface thereof and to the rear thereof, whereby a record stored between two adjacent partitions may be drawn forward by forward movement of the partition having said block, said base having a longitudinal shallow groove in its upper face, the center of which is spaced from the back member by a distance at least as great as the radius of a record to be stored, and a second shallow groove positioned forward of said last-named groove, said grooves being adapted to hold a record edgewise in stored position or forward position, and to prevent rolling of a record when positioned directly above either of said grooves, and said partitions having label tabs on their forward edges, said tabs being staggered sequentially from top to bottom to permit ready access to single tabs, and to permit free uninterfered observation thereof.

15. In a disk record storage cabinet, a base, spaced vertical end walls, and a back member, a plurality of partitions arranged side by side and parallel with said end walls, said partitions being slidable transversely of said base, each of said partitions having a block of a shape substantially complemental to the peripheral edge of a phonograph record on one surface thereof and to the rear thereof, whereby a record stored between two adjacent partitions may be drawn forward by forward movement of the partition having said block, said base having a longitudinal shallow groove in its upper face, the center of which is spaced from the back member by a distance at least as great as the radius of the record to be stored, and a second shallow groove positioned forward of said last-named groove, said grooves being adapted to hold a record edgewise in stored position or forward position, and to prevent rolling of a record when positioned directly above either of said grooves, and means to limit the sliding movement of said partitions transversely of said base.

16. In a disk record storage cabinet, a base, spaced vertical end walls, and a back member, a plurality of partitions arranged side by side and parallel with said end walls, said partitions being slidable transversely of said base, each of said partitions having a block of a shape substantially complemental to the peripheral edge of a phonograph record on one surface thereof and to the rear thereof, whereby a record stored between two adjacent partitions may be drawn forward by forward movement of the partition having said block, said base having a longitudinal shallow groove in its upper face, the center of which is spaced from the back member by a distance at least as great as the radius of a record to be stored, and a second shallow groove positioned forward of said last-named groove, said grooves being adapted to hold a record edgewise in stored position or forward position, and to prevent rolling of a record when positioned directly above either of said grooves, and said partitions having label tabs on their forward edges, said tabs being stapgered sequentially from top to bottom to permit ready access to single tabs, and to permit free uninterfered observation thereof, and means to limit the sliding movement of said partitions transversely of said base.

17. In a disk record storage cabinet, a base, spaced vertical end walls, and a back member, a plurality of partitions arranged side by side and parallel with said end walls, said partitions being slidable transversely of said base, each of said partitions having a block of a shape substantially complemental to the peripheral edge of a phonograph record on one surface thereof and to the rear thereof, whereby a record stored between two adjacent partitions may be drawn forward by forward movement of the partition having said block, said base having a longitudinal shallow groove in its upper face, the center of which is spaced from the back member by a distance at least as great as the radius of a record to be stored, and a second shallow groove positioned forward of said last-named groove, said grooves being adapted to hold a record edgewise in stored position or forward position, and to prevent rolling of a record when positioned directly above either of said grooves, and said partitions having label tabs on their forward edges, said tabs being staggered sequentially from top to bottom to permit ready access to single tabs, and to permit free uninterfered observation thereof, and means to limit the sliding movement of said partitions transversely of said base to a distance less than the distance between the centers of said grooves.

18. In a disk record storage cabinet, a support means for edgewise supporting a substantial arcuate portion of a plurality of records, a plurality of partitions resting edgewise on said support means, and slidable thereon, means on one side of each of said partitions only for spacing said partitions a distance equivalent to the thickness of a record to be stored between adjacent partitions, and shoulder means carried by each partition on said one side only for engaging an edge of a record adjacent each partition, for causing movement of an adjacent record across said support means upon movement of each partition.

19. In a disk record storage cabinet, a base, spaced vertical end walls, and a back member, a plurality of partitions arranged side by side and parallel with said end walls, said partitions being slidable transversely of said base, each of said partitions having a block of a shape substantially complemental to the peripheral edge of a phonograph record on one surface thereof only and to the rear thereof, whereby a record stored between two adjacent partitions may be drawn forward by forward movement of the partition having said block, said base having supporting means engaging an arcuate sector of a record, the center of which is spaced from the back member by a distance at least as great as the radius of the record to be stored, and a second supporting means positioned forward of said last-named supporting means adapted to engage an arcuate sector of a record, both of said supporting means being adapted to hold a record edgewise in stored position or forward position, and to prevent rolling of a record when positioned directly above either of said supporting means, said first-named supporting means and said second-named supporting means providing an intervening high point, over which a record must be lifted in moving from one supporting means to the other, and said partitions having label tabs on their forward edges, said tabs being staggered sequentially from top to bottom to permit ready access to single tabs, and to permit free uninterfered observation thereof.

References Cited in the file of this patent

UNITED STATES PATENTS

| | | |
|---|---|---|
| 1,274,191 | Nixon | July 30, 1918 |
| 1,339,291 | Schissel | May 4, 1920 |

FOREIGN PATENTS

| | | |
|---|---|---|
| 200,399 | Great Britain | July 12, 1923 |
| 272,396 | Great Britain | June 16, 1927 |
| 359,107 | Great Britain | Oct. 22, 1931 |
| 381,705 | France | of 1907 |